Aug. 3, 1954 P. W. WARD 2,685,646

APPARATUS FOR RESHAPING ELECTRIC PULSES

Filed Dec. 14, 1951 2 Sheets-Sheet 1

INVENTOR
PETER WILLIAM WARD
BY
ATTORNEY

Aug. 3, 1954 P. W. WARD 2,685,646

APPARATUS FOR RESHAPING ELECTRIC PULSES

Filed Dec. 14, 1951 2 Sheets-Sheet 2

INVENTOR
PETER WILLIAM WARD
BY [signature]
ATTORNEY

Patented Aug. 3, 1954 2,685,646

UNITED STATES PATENT OFFICE 2,685,646

APPARATUS FOR RESHAPING ELECTRIC PULSES

Peter William Ward, Wembley, England, assignor to The General Electric Company Limited, London, England Application December 14, 1951, Serial No. 261,617

Claims priority, application Great Britain December 22, 1950

4 Claims. (Cl. 250—27)

Figure 1:
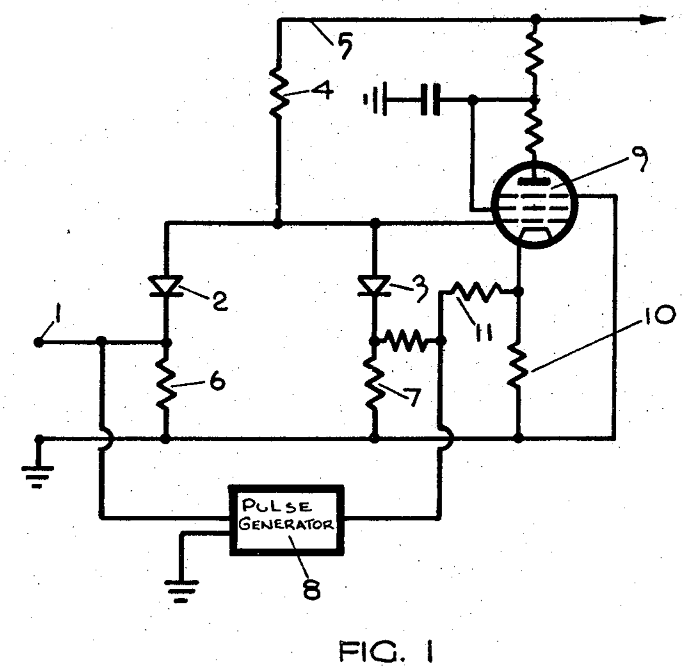

The present invention relates to electric pulse reshaping apparatus. In particular the present invention relates to electric pulse reshaping apparatus for producing in response to an input train of mis-shapen rectangular pulses of a given polarity, which pulses may vary in amplitude and occur at some or all of a series of regularly recurrent time-positions, a train of relatively well-shaped rectangular pulses having the same amplitude variation, if any, and occurring at the same time-positions as the input pulses.

A requirement for such apparatus may arise in various types of electric pulse signalling systems and particularly in pulse amplitude modulation signalling systems for example multichannel telephony systems using time multiplex pulse amplitude modulation techniques. In such systems a receiver or relaying equipment, may receive over one or more transmission links, amplitude modulated pulses of small amplitude, which occur at some or all of a series of regularly recurrent time positions, and which, although generated as a close approximation to rectangular pulses, have been distorted in transmission mainly by broadening and sloping of the sides. Before the received pulses can be utilised it is usually necessary to amplify and, if the distortion is bad, to reshape them. In any case, as will be explained, it may be desirable to reshape the pulses before amplification, if crosstalk and like forms of distortion and interference are to be avoided.

Thus, even with an ideally rectangular pulse input, a well designed pulse amplifier, which might due to inherent valve and stray capacitances include resistance-capacitance circuits having time-constants as great as one twelfth of the shortest interval between pulses, would introduce trailing exponential tails to the pulses. The amplitude of the tails is increased rapidly as the number of successive stages of amplification is increased. For example, after five stages of amplification, the amplitude of the tails at the time of occurrence of the next pulse in a regularly recurrent train would be fifteen times that produced after three stages. With an input pulse train having sloping sides to the pulses the effect is considerably enhanced. It will be appreciated that in a multichannel pulse amplitude modulation signalling system, the introduction of exponential tails having a substantial amplitude at the occurrence of the next succeeding pulse will introduce considerable crosstalk, and the effect must therefore be limited.

Limitation of the introduction of exponential tails to the pulses may be effected, by employing a rigorously designed and accurately adjusted wide band amplifier. This has the disadvantage however that the amplifier becomes elaborate, and therefore bulky and costly. A further method of effecting the limitation, or rather of eliminating the tails before they reach an undesirable amplitude, would be to reshape the pulses after every two or three stages of amplification so as to eliminate the tails, and if the pulses to be applied to the amplifier are already mis-shapen to reshape the pulses before application to the amplifier. In the systems previously discussed this depends on the availability of electric pulse reshaping apparatus which may be used for reshaping small amplitude pulses, particularly where the amplitude varies significantly as in the pulse amplitude modulation systems.

It is an object of the present invention to provide electric pulse reshaping apparatus for producing in response to an input train of mis-shapen pulses of a given polarity which pulses may vary in amplitude and occur at some or all of a series of regularly recurrent time positions, a train of relatively well-shaped rectangular pulses having the same amplitude variation, if any, and occurring at the same time positions as the input pulses, which apparatus may be operated satisfactorily even when the input pulses are of small amplitude.

It is a further object of the present invention to provide a simple pulse amplifier in which the introduction of exponential tails is limited.

According to the present invention electric pulse reshaping apparatus for producing, in response to an input train of mis-shapen rectangular pulses of a given polarity, which pulses may vary in amplitude and occur at some or all of a series of regularly recurrent time positions, a train of relatively well-shaped pulses having the same amplitude variation, if any, and occurring at the same time positions as the input pulses, comprises a pulse generator for generating a train of substantially rectangular pulses of the same polarity as the input pulses, having a constant amplitude at least equal to the maximum amplitude of the input pulses, and occurring at all of said series of time positions, a pair of rectifying devices the electrodes of which of the same polarity as the input pulses are connected together and to one terminal of a load resistance, means for applying the input of pulses to the other electrode of one of the rectifying devices, means for applying an output from the pulse generator to the other electrode of the other rectifying device, means for applying a bias potential across the other terminal of the resistance and the other electrodes of the rectifying devices of the same polarity as the input pulses and at least equal to the maximum pulse potential applied to either rectifying device, and means for deriving the required output pulse train from the potential variations at the connected electrodes of the rectifying devices.

Preferably the rectifying devices are germanium crystal rectifiers.

A multistage electric pulse amplifier may include one or more pulse reshaping apparatus in accordance with the present invention, connected to reshape the pulse train input applied in operation to the amplifier and/or pulse trains applied in operation from one stage of the amplifier to the next. Where more than one pulse reshaping apparatus is included in an amplifier, the pulse generator of each said apparatus may be a single one common to them all.

One embodiment of electric pulse reshaping apparatus in accordance with the present invention will now be described by way of example with reference to the accompanying drawings in which, Figure 1 shows a circuit diagram, partly in block, of the electric pulse reshaping apparatus together with the first stage of an amplifier to which the output from the apparatus is coupled, and Figures 2(*a*)–(*e*) show waveforms illustrating the operation of the apparatus.

The apparatus to be described forms part of an hundred channel pulse amplitude modulation time multiplex telephony system. At an exchange interlaced pulse trains for any number of the channels may be received simultaneously over transmission links. The pulses have an amplitude of 200–300 millivolts, and when pulse trains for all the channels are received together, the combined recurrence frequency is approximately $10^6$ pulses per second. Although shaped as well as possible at the transmission equipment to an ideal rectangular shape, the pulses are distorted in transmission and become mis-shapen. Part of a typical received pulse train comprising one pulse from each of a small number of the channels is shown in Figure 2(*a*), the gaps occurring at the time positions allotted to channels not at the moment in use.

Figure 2:
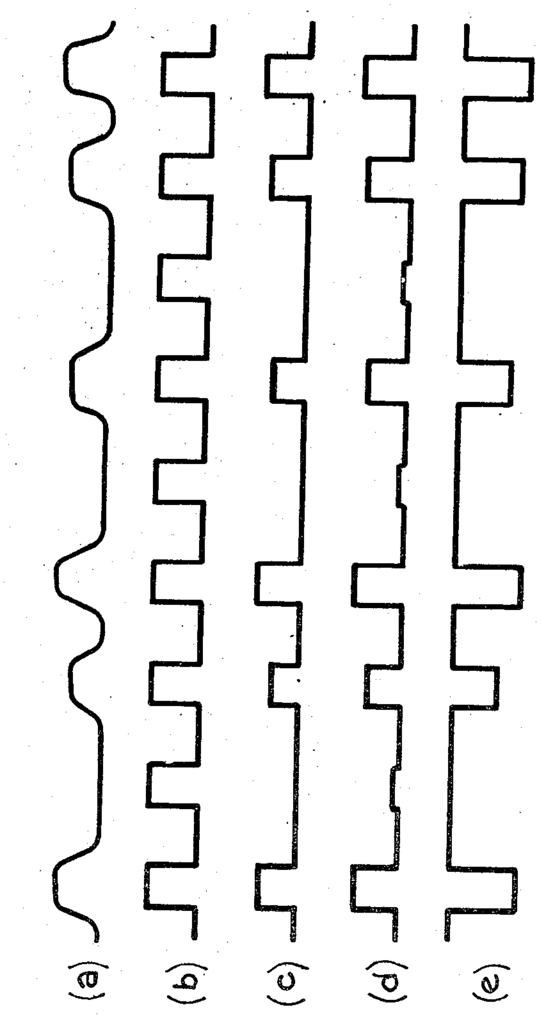

Referring now to Figure 1 of the accompanying drawings, the pulses to be reshaped, which will be assumed to be positive pulses and may be as shown in Figure 2(*a*), are applied across the input terminal 1 and earth. The apparatus includes a pair of rectifying devices 2 and 3, which are preferably germanium crystal rectifiers, and the positive electrodes (that is, those electrodes from which conventional current flows to other electrodes in operation) of which are connected together and to one terminal of a resistor 4, the other termnial of which is connected to a positive H. T. supply line 5. The negative electrodes (that is, those electrodes to which conventional current flows in operation) of the rectifying devices 2 and 3 are each connected to earth through a resistor 6 or 7 respectively. The input terminal 1 is connected to the negative electrode of the rectifying device 2.

A pulse generator 8, which may be of any suitable form and is shown as a block in Figure 1, is also connected to the terminal 1. In operation, the pulse generator 8 generates regularly recurrent substantially rectangular pulses of constant amplitude, the amplitude being greater than the maximum amplitude of the input pulses. The input pulses from terminal 1 are applied to the pulse generator 8 to synchronise the recurrence frequency of its output to that of the combined input pulse train when all the channels are in operation, i. e. in this particular case to approximately $10^6$ pulses per second. The output from the pulse generator 8 is illustrated in Figure 2(*b*), and it will be appreciated that the pulses it generates occur at all the time positions at which an input pulse may occur.

An output from the pulse generator 8 is applied to the negative electrode of the rectifying device 3. The potential applied to the H. T. line 5 is greater than that of the largest amplitude pulse applied to the negative electrodes of the rectifying devices 2 and 3. In consequence, the waveform at the positive electrodes of the rectifying devices 2 and 3, follows at any instant the waveform at that one of the two negative electrodes which is at the lower potential. For the waveforms shown in Figures 2(*a*) and 2(*b*), the corresponding waveform at the positive electrodes of the rectifying devices 2 and 3 is ideally as shown in Figure 2(*c*), the pulses having amplitudes defined by the amplitudes of the input pulses of Figure 2(*a*), and having straight sides defined by those of the output from the pulse generator 8 as shown in Figure 2(*b*).

In practice, owing to the rectifying devices 2 and 3 having a finite reverse resistance, small "break-through" pulses will occur at the positive electrodes, on the occasions when there is no input pulse and a pulse from the pulse generator 8 is applied to the rectifying device 3. This is illustrated in Figure 2(*d*) which shows the same output waveform as Figure 2(*c*) except that the "break-through" pulses are included.

To remove the break-through pulses from the output pulse train, an output from the pulse generator 8 might be added to the output pulse train in the correct polarity and amplitude to cancel with the break-through pulses. This may be effected conveniently in the first stage of an amplifier to which the output pulse train is applied. Thus in Figure 1, the positive electrodes of the rectifying devices 2 and 3 are connected to the control grid of a pentode thermionic valve 9 which is connected in a conventional amplifier circuit. The pentode valve 9 has a cathode load 10, across which an output from the pulse generator 8 is applied to the cathode of the valve 9. The amplitude of the pulses applied to the cathode of the valve 9, is adjusted by choosing the value of the resistor 11 which acts in effect as an input potentiometer, so that the break-through pulses do not appear at the anode of the valve 9. The pulse train appearing at the anode of the valve 9 is illustrated by the waveform shown in Figure 2(*e*).

If it is required to use more than two or three stages of amplification, reshaping apparatus in accordance with the present invention may be included after every third stage for example, the output of the third stage being applied to the input of the reshaping apparatus and the output of the reshaping apparatus being applied to the next stage. In order to effect economy of apparatus, the same pulse generator 8 may be used to apply the rectangular pulses to each reshaping apparatus, the amplitude of the pulses being greater than the maximum amplitude of the input pulses to the last reshaping apparatus in the circuit.

Figure 3:
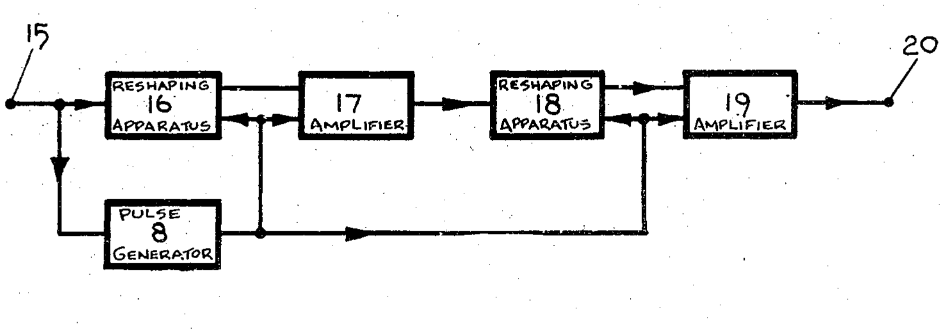

A block circuit diagram of a multistage amplifier is shown in Figure 3. The input pulses are applied at terminal 15, which is connected to the first reshaping apparatus 16 and to the pulse generator 8. The output from the reshaping apparatus is applied to a two or three stage amplifier 17, the output of which is applied to a second reshaping apparatus 18. The outut from the reshaping apparatus 18 is applied to a second amplifier 19, and thence to an output terminal 20. If desired further reshaping apparatus and stages of amplification may be added. Outputs from the pulse generator 8 are applied to the two reshaping apparatus 16 and 18, and to the two amplifiers 17 and 19 for use in eliminating "break-through" pulses, by application to the first stages of the amplifiers 17 and 19 in the manner described with reference to Figure 1.

In many cases where it is required to use reshaping apparatus is accordance with the present invention, a pulse generator similar to the pulse generator 8 may be required for other purposes, for example, in a channel distributor and it may not be necessary to provide a separate pulse generator for the reshaping apparatus.

If the pulses of the input train are of opposite polarity to those in the previously described example, that is, negative-going pulses, the connections of the reshaping apparatus are re-arranged accordingly. Thus the negative electrodes of the rectifying devices 2 and 3 are connected together, the pulse trains are applied to their positive electrodes, the output from the pulse generator 8 is arranged to be a negative-going pulse train, and the terminal of the resistor 4 not connected to the rectifying devices 2 and 3 would be connected to a point of negative potential, or for convenience it might be earthed and the resistors 6 and 7 connected to a point of positive potential.

I claim:

1. Electric pulse reshaping apparatus for producing, in response to an input train of misshapen rectangular pulses of a given polarity, which pulses may vary in amplitude and occur at at least some of a series of regularly recurrent time positions, a train of relatively well-shaped pulses having the same amplitude variation, if any, and occurring at the same time positions as the input pulses, comprising: a pair of input terminals to which the input pulses are applied; a pulse generator for generating a train of substantially rectangular pulses of the same polarity as the input pulses and having a constant amplitude at least equal to the maximum amplitude of the input pulses; means electrically connecting the input terminals to the pulse generator for applying the input pulses to the pulse generator to synchronise it so that said generated pulses occur at all of said series of time position; a first and a second rectifying device; an electrical connection between the electrodes of the two rectifying devices which are of the same polarity as the input pulses; means electrically connected to the input terminals for applying the input pulses to the other electrode of the first rectifying device; a resistance having one terminal connected to the connected electrodes of the two rectifying devices, means for applying an output from the pulse generator to the other electrode of the second rectifying device; means for applying a direct current potential, of the same polarity as the input pulses and at least equal to the maximum pulse potential applied to either of the two rectifying devices, to the other terminal of the resistance; and means for deriving the required output pulse train from the potential variations occurring in operation at the connected electrodes of the two rectifying devices.

2. Electric pulse reshaping apparatus for producing, in response to an input train of misshapen rectangular pulses of a given polarity, which pulses may vary in amplitude and occur at at least some of a series of regularly recurrent time positions, a train of relatively well-shaped pulses having the same amplitude variation, if any, and occurring at the same time positions as the input pulses, comprising: a pair of input terminals to which the input pulses are applied; a pulse generator for generating a train of substantially rectangular pulses of the same polarity as the input pulses and having a constant amplitude at least equal to the maximum amplitude of the input pulses; means electrically connecting the input terminals to the pulse generator for applying the input pulses to the pulse generator to synchronise it so that said generated pulses occur at all of said series of time positions; a first and a second rectifying device; a first resistance; means electrically interconnecting one terminal of the first resistance and the electrodes of the two rectifying devices of the same polarity as the input pulses; two other equal resistances each having one terminal connected to the other electrode of a respective one of the two rectifying devices; means electrically connected to the input terminals for applying the input pulses across one of the two equal resistances; means for applying an output from the pulse generator across the other of the two equal resistances; means for applying a direct current potential at least equal to the maximum pulse potential applied across either of the two equal resistances and of the same polarity as the input pulses, across the other terminal of the first resistance and the other terminals of the two equal resistances together; and a pair of output terminals electrically connected across the connected electrodes of the two rectifying devices and the other terminals of the two equal resistances.

3. Electric pulse reshaping apparatus for producing, in response to an input train of misshapen rectangular pulses of a given polarity, which pulses may vary in amplitude and occur at at least some of a series of regularly recurrent time positions, a train of relatively well-shaped pulses having the same amplitude variation, if any, and occurring at the same time positions as the input pulses, comprising: a pulse generator for generating a train of substantially rectangular pulses of the same polarity as the input pulses, having a constant amplitude at least equal to the maximum amplitude of the input pulses and occurring at all of a series of regularly recurrent time positions, at least some of which coincide with the time positions of the input pulses; a first and a second rectifying device; an electrical connection between the electrodes of the rectifying devices which are of the same polarity as the input pulses; a pair of input terminals to which the input pulses are applied; means electrically connected to the input terminals for applying the input pulses to the other electrode of the first rectifying device; means for applying an output from the pulse generator to the other electrode of the second rectifying device; a resistance having one terminal connected to the connected electrodes of the two rectifying devices; means for applying a direct current potential, of the same polarity as the input pulses and at least equal to the maximum pulse potential applied to either of the two rectifying devices, to the other terminal of the resistance; and means for deriving the required output pulse train from the potential variations occurring in operation at the connected electrodes of the two rectifying devices, said last-named means comprising a single pulse amplifier stage the input of which is coupled to the connected electrodes of the two rectifying devices, and means for applying an output from the pulse generator to the amplifier stage so that unwanted pulses appearing in operation at the connected electrodes of the rectifying device by breaking through the second rectifying device when no input pulse is applied to the first rectifying device, are cancelled in the amplifier stage and do not appear at the output of the amplifier stage.

4. Electric pulse reshaping apparatus according to claim 1 in which said means for deriving the required output pulse train from the potential variations occurring in operation at the connected electrodes of the two rectifying devices includes a single pulse amplifier stage the input of which is coupled to the connected electrodes of the two rectifying devices, and means for applying an output from the pulse generator to the amplifier stage so that unwanted pulses appearing in operation at the connected electrodes of the rectifying device by breaking through the second rectifying device when no input pulse is applied to the first rectifying device, are cancelled in the amplifier stage and do not appear at the output of the amplifier stage.

References Cited in the file of this patent

UNITED STATES PATENTS

| Number | Name | Date |
|---|---|---|
| 2,557,729 | Eckert, Jr. | June 19, 1951 |
| 2,584,138 | Lichtman | Feb. 5, 1952 |